United States Patent
Randall et al.

(10) Patent No.: US 12,398,776 B2
(45) Date of Patent: Aug. 26, 2025

(54) RACE COOLER WITH INTEGRATED BASE VALVE

(71) Applicant: Fox Factory, Inc., Duluth, GA (US)

(72) Inventors: Connor Randall, Salida, CO (US);
Ivan Tong, San Diego, CA (US);
Regan Woelfel, Scotts Valley, CA (US)

(73) Assignee: Fox Factory, Inc., Duluth, GA (US)

(*) Notice: Subject to any disclaimer, the term of this patent is extended or adjusted under 35 U.S.C. 154(b) by 425 days.

(21) Appl. No.: 17/903,903

(22) Filed: Sep. 6, 2022

(65) Prior Publication Data
US 2023/0083031 A1    Mar. 16, 2023

Related U.S. Application Data

(60) Provisional application No. 63/242,997, filed on Sep. 10, 2021.

(51) Int. Cl.
| F16F 9/42 | (2006.01) |
| B60G 13/08 | (2006.01) |
| F16F 9/19 | (2006.01) |

(52) U.S. Cl.
CPC ............... *F16F 9/42* (2013.01); *B60G 13/08* (2013.01); *B60G 2202/24* (2013.01); *B60G 2206/41* (2013.01); *B60G 2600/72* (2013.01); *B60G 2800/162* (2013.01); *F16F 9/19* (2013.01); *F16F 2222/12* (2013.01); *F16F 2230/00* (2013.01); *F16F 2232/08* (2013.01); *F16F 2234/02* (2013.01)

(58) Field of Classification Search
CPC .. F16F 9/19; F16F 9/42; F16F 2222/12; F16F 2230/00; F16F 2232/08; B60G 13/08; B60G 2202/24; B60G 2206/41; B60G 2800/162

USPC ........... 188/266.5, 266.6, 318, 319.1, 319.2, 188/322.2, 322.21
See application file for complete search history.

(56) References Cited

U.S. PATENT DOCUMENTS

| 4,061,320 A | | 12/1977 | Warner | |
| 4,153,237 A | * | 5/1979 | Supalla | B60G 17/04 188/266.8 |
| 4,491,207 A | * | 1/1985 | Boonchanta | F16F 9/46 188/266.5 |

(Continued)

FOREIGN PATENT DOCUMENTS

| CN | 111237376 A | | 6/2020 | |
| CN | 111237376 B | * | 7/2021 | ............... F16F 9/42 |

(Continued)

OTHER PUBLICATIONS

European Extended Search Report for EP Application No. 22195222. 9, 17 Pages, Mailed Feb. 7, 2023.

*Primary Examiner* — Christopher P Schwartz

(57) ABSTRACT

Disclosed herein is a cooling device comprising a cooler body, wherein the cooler body has a first chamber and a second chamber, a cooler body cap disposed to fluidly couple the first chamber and the second chamber, wherein the cooler body cap has a recess that is suitable to receive a base valve, a first hose that is fluidly coupled to the first chamber, a second hose that is fluidly coupled to the second chamber, and an adapter, wherein the adapter is connected to the first hose and the second hose, wherein the adapter has channels to direct fluid flow.

15 Claims, 10 Drawing Sheets

(56) References Cited

U.S. PATENT DOCUMENTS

| | | | |
|---|---|---|---|
| 4,958,706 A * | 9/1990 | Richardson | F16F 9/512 |
| | | | 188/319.1 |
| 6,296,092 B1 | 10/2001 | Marking et al. | |
| 8,763,770 B2 * | 7/2014 | Marking | B60G 17/08 |
| | | | 188/274 |
| 9,796,232 B2 * | 10/2017 | Cox | F16F 9/065 |
| 10,576,803 B2 | 3/2020 | Marking et al. | |
| 10,737,546 B2 * | 8/2020 | Tong | F16F 9/065 |
| 10,859,133 B2 | 12/2020 | Cox et al. | |
| 11,400,783 B2 | 8/2022 | Cox | |

FOREIGN PATENT DOCUMENTS

| | | | |
|---|---|---|---|
| EP | 0083911 A1 | 7/1983 | |
| EP | 2495472 A2 | 9/2012 | |
| JP | H06159428 A | 6/1994 | |
| JP | 2003172392 A * | 6/2003 | F16F 9/42 |

\* cited by examiner

RACE COOLER WITH INTEGRATED BASE VALVE

CROSS-REFERENCE TO RELATED APPLICATIONS (PROVISIONAL)

This application claims priority to and benefit of U.S. Provisional Patent Application No. 63/242,997 filed on Sep. 10, 2021, entitled "RACE COOLER WITH INTEGRATED BASE VALVE" by Randall et al., and assigned to the assignee of the present application, the disclosure of which is hereby incorporated by reference in its entirety.

BACKGROUND ART

Shock fade is when the oil in a suspension system increases in temperature over time, leading to a change in the viscosity and in turn the damping rate. Such a change can cause issues in both OEM testing and in races. Shock fade can also cause the O-rings to set, and in certain cases can lead to damaged and leaking seals.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1:
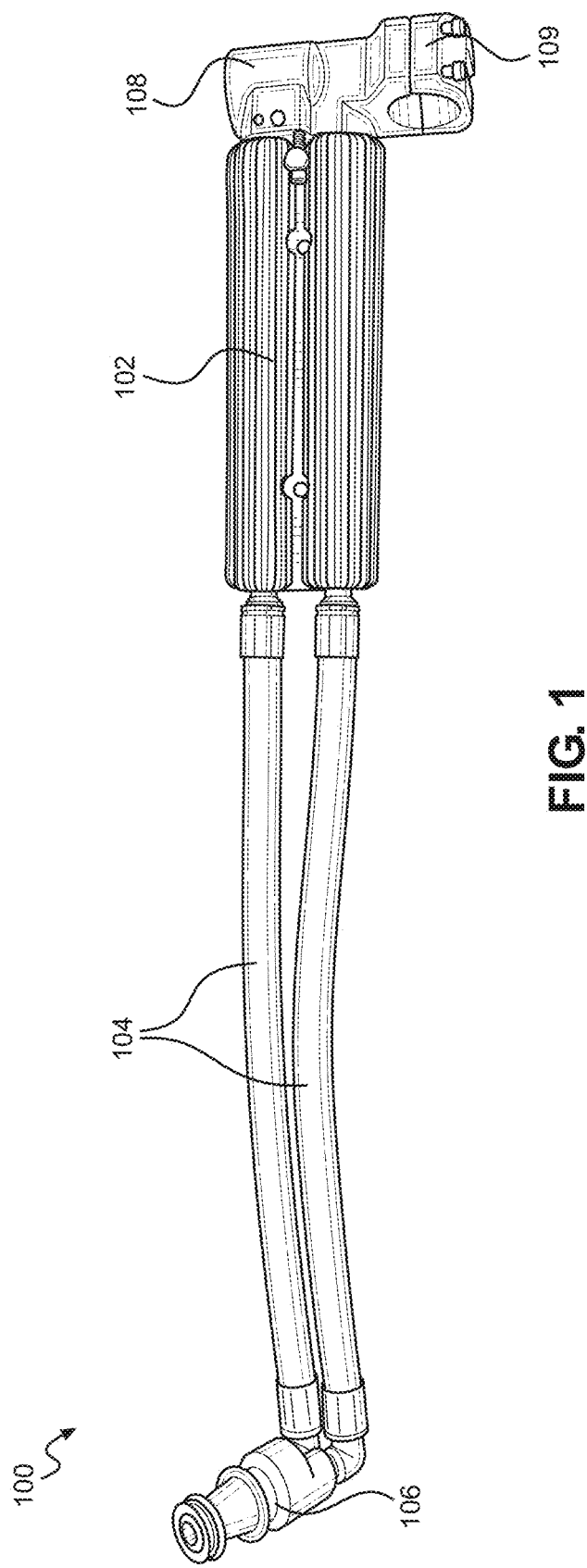
FIG. 1 shows a perspective view of a cooler.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Shock absorbers (e.g., dampers) are used in numerous different vehicles and configurations to absorb some or all of a movement that is received at a first portion of a vehicle before it is transmitted to a second portion of the vehicle. For example, when a wheel hits a pothole, the encounter will cause an impact force on the wheel. However, by utilizing suspension components including one or more dampers, the impact force can be significantly reduced or even absorbed completely before it is transmitted to a person on a seat of the vehicle.

Conventional damping components provide a constant damping rate during compression or extension through the entire length of the stroke. Other conventional damping components provide mechanisms for varying the damping rate. Further, in the world of bicycles, damping components are most prevalently mechanical. As distinct types of recreational and sporting vehicles continue to become more technologically advanced, what is needed in the art are improved techniques for varying the damping rate.

Typical shock absorbers consist of at least a cylinder with an inner diameter, a rod movably disposed within the cylinder, and a main damping piston coupled to the rod. The main damping piston is configured to divide the cylinder into a compression side and a rebound side.

Such shock absorbers may be monotube, or two concentric cylinders. The main damping piston may be vented or solid. Internal bypasses or external bypasses may also be present. Some shock absorbers have an external reservoir with a bladder or floating piston.

For additional detail and description of a shock absorber/damper, see, as an example, U.S. Pat. No. 10,576,803 the content of which is incorporated by reference herein, in its entirety. For additional detail and description of position-sensitive shock absorber/damper, see, as an example, U.S. Pat. No. 6,296,092 the content of which is incorporated by reference herein, in its entirety.

For additional detail and description of adjustable compression and/or rebound damping, preload, crossover, bottom-out, and the like for a shock absorber/damper, see, as an example, U.S. Pat. No. 10,859,133 the content of which is incorporated by reference herein, in its entirety.

A configuration of an external and/or side reservoir, including a floating piston, is described in U.S. Pat. No. 11,400,783 the content of which is incorporated by reference herein, in its entirety.

During high speed racing and similar applications, shock absorbers can undergo shock fade. Shock fade is when the oil or working fluid within the shock absorber increases in temperature to a point where the viscosity of the fluid will change. When the viscosity changes, the rider can experience a decrease in handling quality of the bike or vehicle, as well as increased discomfort. During a race or competition, shock fade can greatly impact a riders performance.

In some cases, shock fade can also cause the O-rings in a shock to set, or damage the seals and O-rings in the shock, leading to leaks and decreased performance.

Shock fade is usually caused by friction within the shock absorbers, such as when the fluid passes through valves (e.g., base valve, main damping piston, bypass valves, etc.) or tight chambers. Other factors can contribute to shock fade such as increased ambient temperature, or mounting position of the shock (for example, if the shock is placed close to the exhaust).

Currently, riders experiencing shock fade can opt to pause their activity until the shocks have cooled off a decent amount. This is an unideal solution, as it can negatively impact a race or a broad experience.

FIG. 1 shows a perspective view of a cooler 100, according to some embodiments. Cooler 100 includes a cooler body 102, hoses 104, adapter 106, cooler body cap 108, and bar mount 109. Cooler 100 acts to limit the temperature of the oil within a suspension system. In some embodiments, the cooler body 102 has cooling fins on the outside surface. As oil flows through the cooler body 102, heat will be dispersed from the oil to the surrounding atmosphere via the cooling fins on the cooler body 102.

In some embodiments, adapter 106 is used to couple the cooler 100 to a suspension system in the location a base valve is normally placed. In some embodiments, cooler 100 is an additional part for suspension systems with a piggyback reservoir. In some embodiments, cooler body cap 108 is used to couple a base valve to the cooler 100. In some embodiments, cooler body cap 108 is suitable to receive a base valve.

In some embodiments, bar mount 109 is used to mount cooler 100 to a place on a vehicle that gets a suitable amount of airflow. The airflow over the cooling fins assists in heat dispersion. In some embodiments, cooler 100 is mounted on a roll cage. In some embodiments, hoses 104 are exchangeable with hoses of different lengths to accommodate installation.

Figure 2:
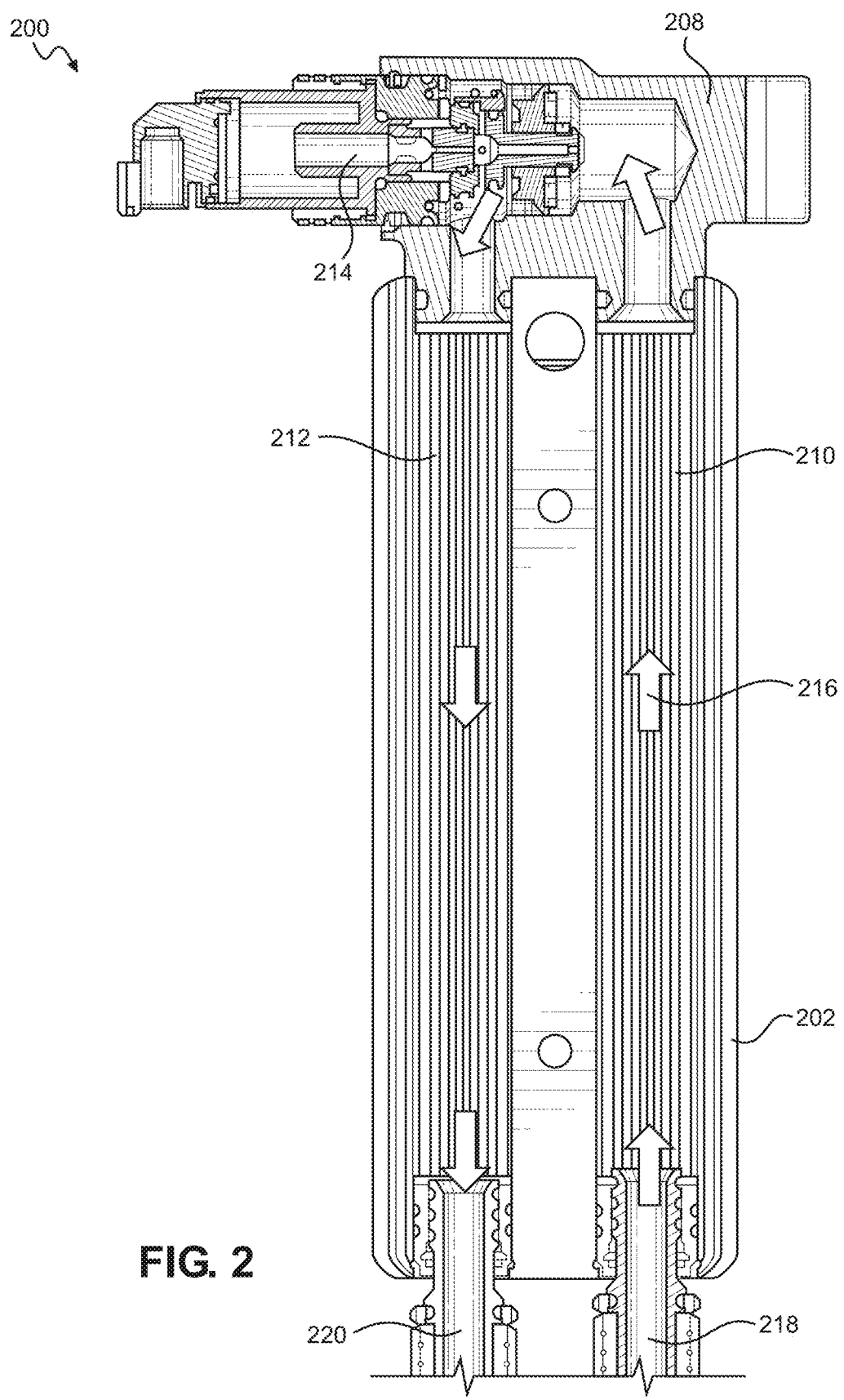
FIG. 2 shows a cross section view of a cooler.

FIG. 2 shows a cross section view of a cooler 200. Cooler 200 includes cooler body 202, cooler body cap 208, a first chamber 210, a second chamber 212, base valve 214, flow arrows 216, first hose plug 218, and second hose plug 220.

In some embodiments, flow arrows 216 indicate the direction of fluid flow during a compression stroke of a suspension system. In this embodiment, a first hose is fluidly coupled with the compression chamber of a shock absorber while second hose is fluidly coupled to a piggyback reservoir. In some embodiments, the first hose and the second hose connect to the adapter 106, which has channels to direct the fluid flow (as seen in at least FIG. 3). In some embodiments, the adapter fluidly coupled the first hose to the compression chamber, and the adapter fluidly couples the second hose to a piggyback reservoir.

Following flow arrows 216, the fluid first enters from the first hose though a first hose plug 218 and flows into the first chamber 210. The fluid then flows through base valve 214, through second chamber 212, and out through second hose plug 220 into a second hose. The fluid flow from the hoses and through the adapter 106 can be seen in at least FIG. 3 and FIG. 4.

In previous cooler designs, base valve 214 was separate from the cooling system. As the base valve is one of the points where friction generates large amounts of heat, it would be beneficial to be able to cool the fluid after it goes through base valve 214. In some embodiments the cooler 100 is installed by removing base valve 214 from its initial position and installing it in the cooler body cap 208 as shown in at least FIG. 2. The adapter 106 is then connected to the shock absorber where the base valve was initially installed. With the base valve 214 in the cooling flow path, there is time for the oil to cool off again after heating up as it passes through base valve 214. The new placement of base valve 214 also assists in generally lowering the temperature of the base valve 214. In some embodiments, the base valve is in the fluid flow path between the first chamber and the second chamber.

In some embodiments, base valve 214 is reused from the original shock absorber. In some embodiments, the base valve can be exchanged for a new one. In some embodiments, base valve 214 has a check plate to keep the fluid circulating instead of yo-yoing back and forth. In some embodiments, base valve 214 can be upgraded from a passive valve to a live valve.

In one embodiment, instead of (or in addition to) restricting the flow through the orifice, the active valve can vary a flow rate through an inlet or outlet passage within the active valve, itself. In other words, the active valve, can be used to meter the working fluid flow (e.g., control the rate of working fluid flow) with/or without adjusting the flow rate through orifice.

Figure 3:
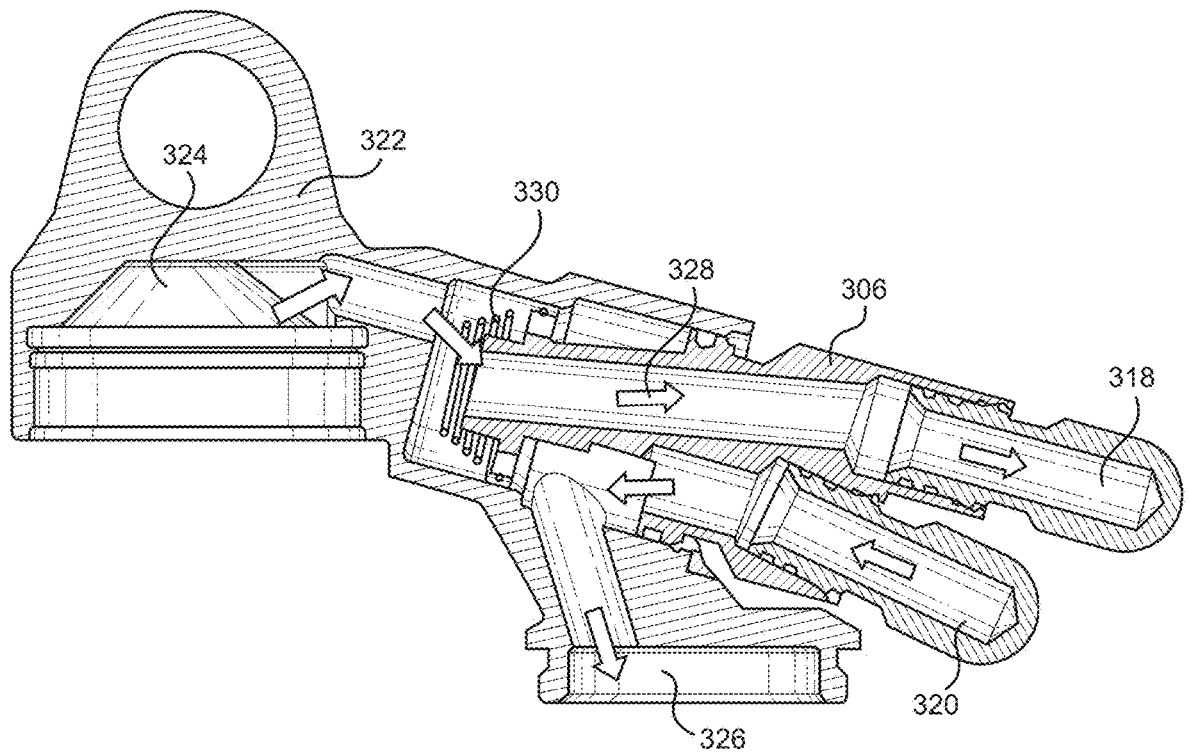
FIG. 3 shows a cross section view of the adapter during a compression stroke.

FIG. 3 shows a cross section view of the adapter 306 during a compression stroke. FIG. 3 also includes first hose plug 318, second hose plug 320, body cap 322, compression chamber 324, piggyback reservoir 326, compression flow arrows 328, and shim stack 330.

Figure 4:
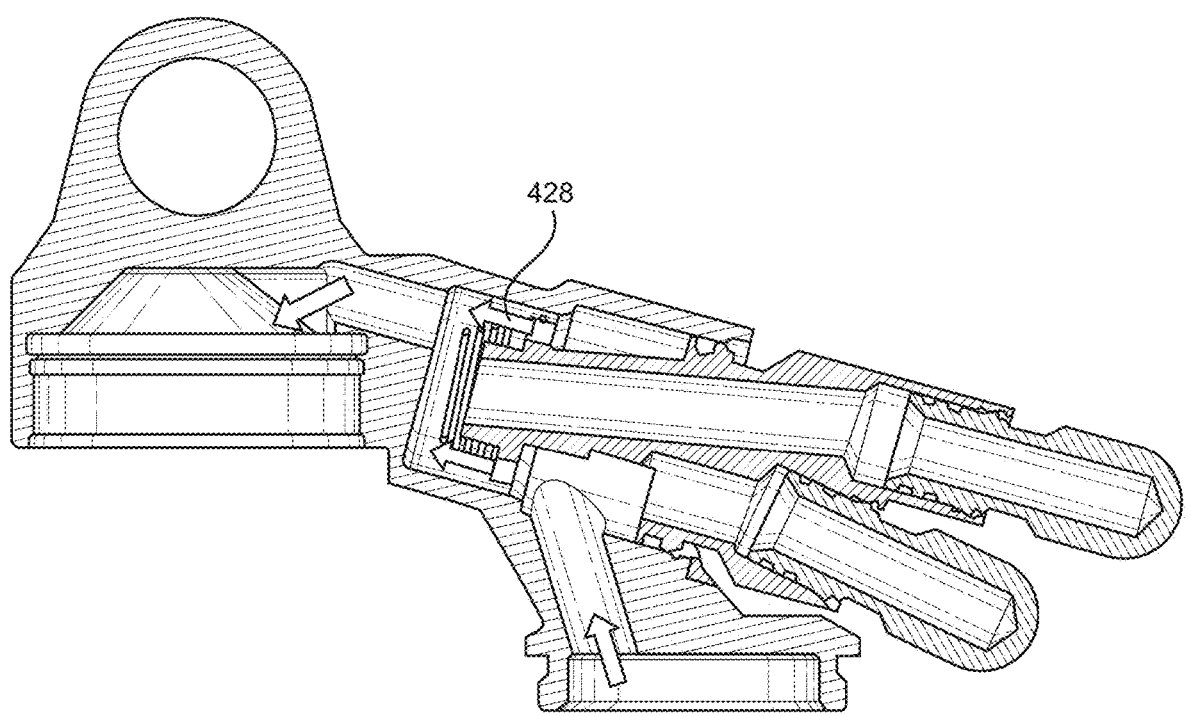
FIG. 4 shows a cross section view of the adapter during a rebound stroke.

FIG. 4 shows a cross section view of the adapter 306 during a rebound stroke. FIG. 4 also includes rebound flow arrows 428.

In some embodiments, adapter 306 is inserted into the body cap 322 where a base valve was previously inserted. As shown by compression flow arrows 328, during a compression stroke, as seen in at least FIG. 3, fluid flows from the compression chamber into a chamber that leads to the first hose plug 318 and to the first hose. From there, the fluid flows through the cooler as shown in at least FIG. 2. After flowing through the cooler body, fluid will then flow though the second hose, through second hose plug 320, and into a piggyback reservoir 326. During a rebound stroke, as seen in at least FIG. 4, fluid will flow out of the piggyback reservoir 326, past shim stack 330, and into the compression chamber 324, as shown by rebound flow arrows 428. Shim stack 330 is disposed between the compression chamber and the piggyback reservoir to prevent fluid flow from the compression chamber to the piggyback reservoir.

With the rebound stroke pulling fluid from the piggyback reservoir 326, and shim stack 330 preventing fluid from flowing directly to the piggyback reservoir 326 in a compression stroke, fluid is encouraged to circulate such that the cooling mechanism is effective.

In some embodiments, adapter 306 is compatible with more than one type of base valve fitting. In some embodiments, the adapter 306 fits large bore base valves. In some embodiments, the first hose and the second hose are different lengths. In some embodiments, the initial suspension system utilizes a remote reservoir, in which case a body cap capable of coupling to the adapter is installed. In some embodiments, the remote reservoir is exchanged for a piggyback reservoir.

In some embodiments, the connection between the hose plugs and the adapter is at an angle. One benefit of having the connection at an angle is that it allows for either straight hose plugs or 90-degree hose plugs to be used. This flexibility allows for the cooler to be easily adapted to more systems and vehicle structures.

Figure 5:
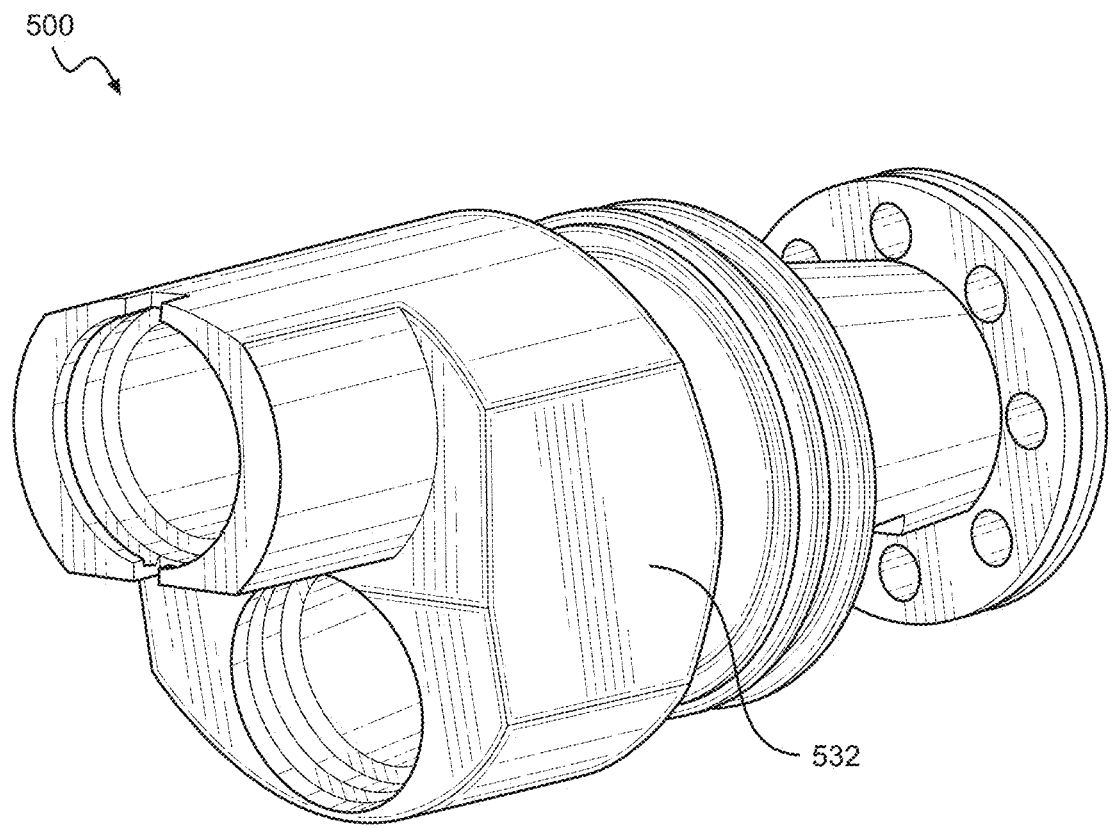
FIG. 5 shows a perspective view of the adapter.

FIG. 5 shows a perspective view of the adapter 500. In some embodiments, sides 532 are flat to allow for clearance with a variety body caps.

Figure 6:
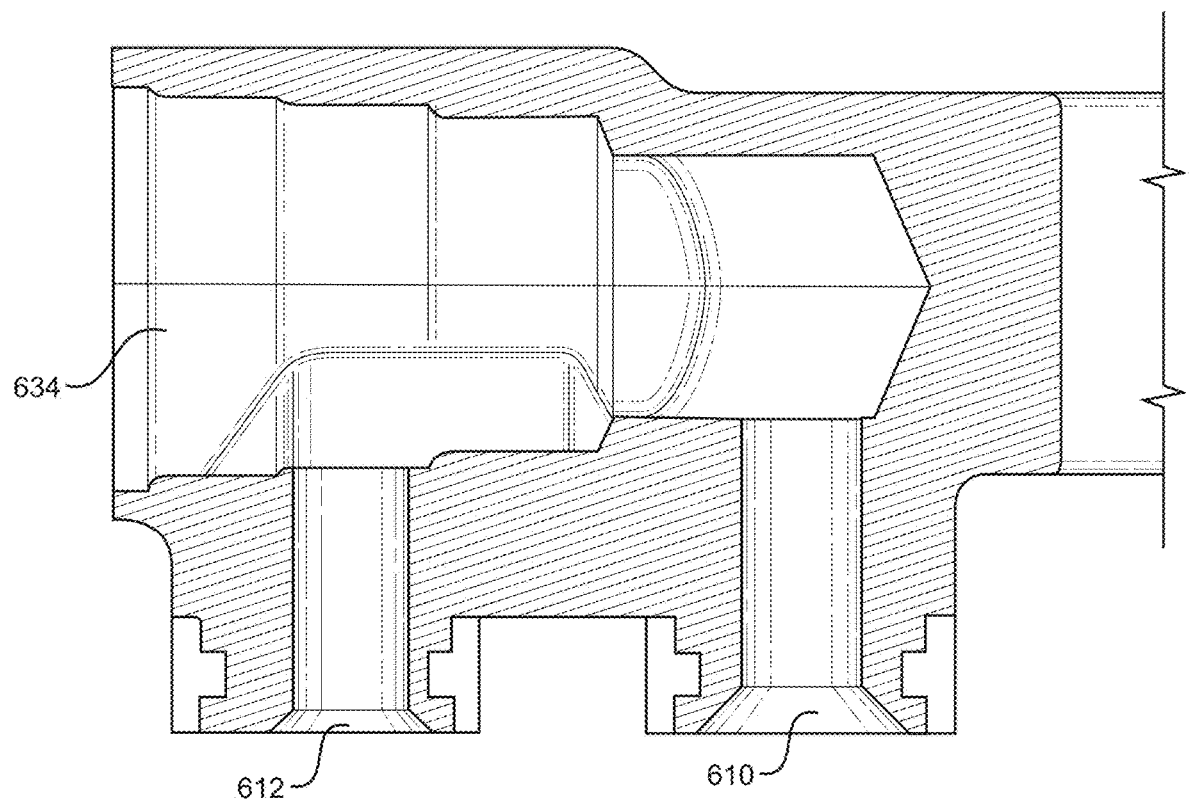
FIG. 6 shows a cross section view of a cooler body cap.

FIG. 6 shows a cross section view of a cooler body cap 600. FIG. 6 also includes first chamber 610, second chamber 612, and recess 634. In some embodiments, recess 634 is capable of coupling to multiple types of base valves. In some embodiments, the base valve is retained in the recess by a snap fit. In some embodiments, the base valve is retained in the recess via threading. In some embodiments, the base valve is retained in the recess by screws.

Figure 7:
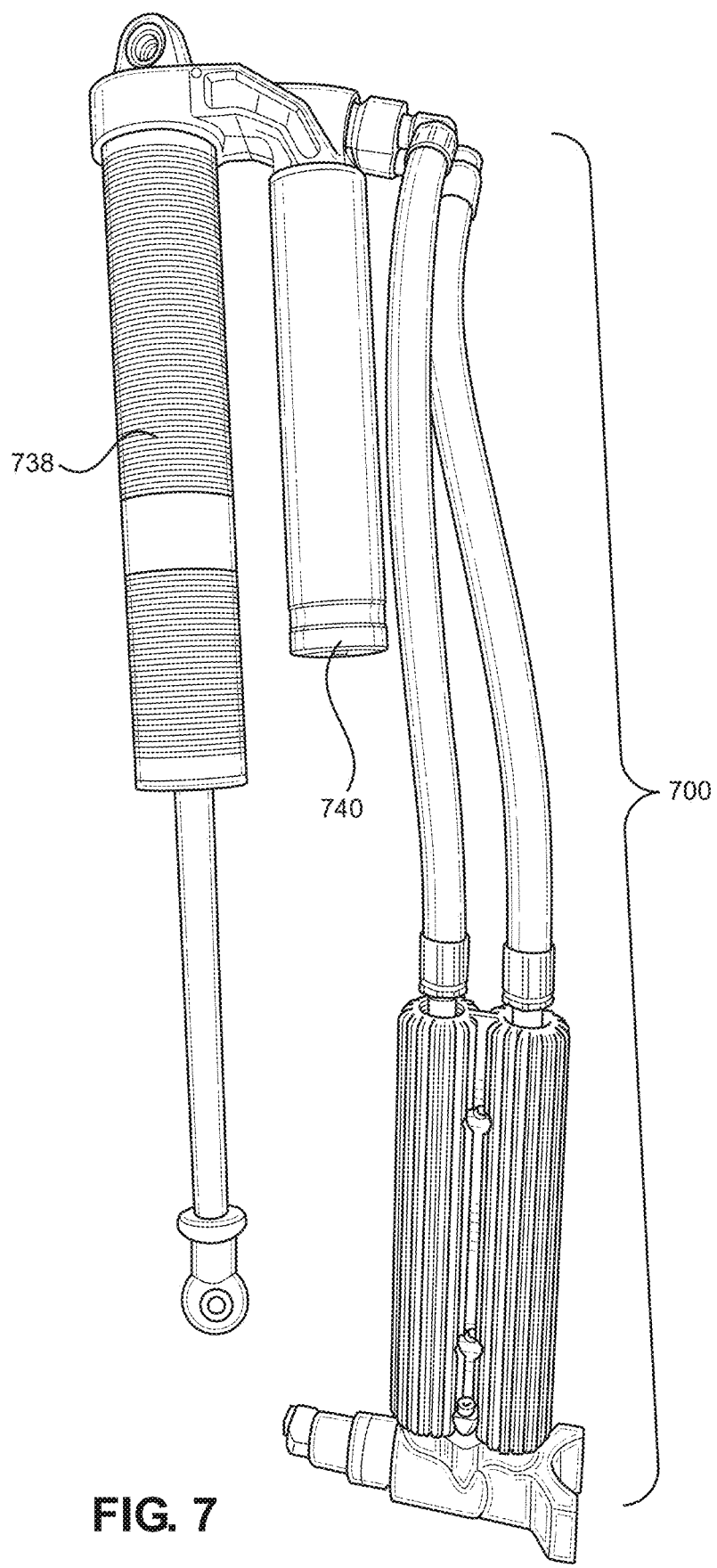
FIG. 7 shows a top-down view of a cooler coupled to a suspension system with a piggyback reservoir.

FIG. 7 shows a top-down view of a cooler 700 coupled to a suspension system 738 with a piggyback reservoir 740.

In some embodiments, the cooler 700 is mounted on a roll cage. In some embodiments, the cooler 700 is mounted in a place where it gets a suitable amount of airflow for cooling. In some embodiments, water is utilized in the cooling process. In some embodiments, not shown, the cooler body would have four ports and at least three chambers. The third chamber, and additional two ports, are filled with a cooling fluid such as, for example, water. In this embodiment, a pump is used to circulate the cooling fluid.

Figure 8:
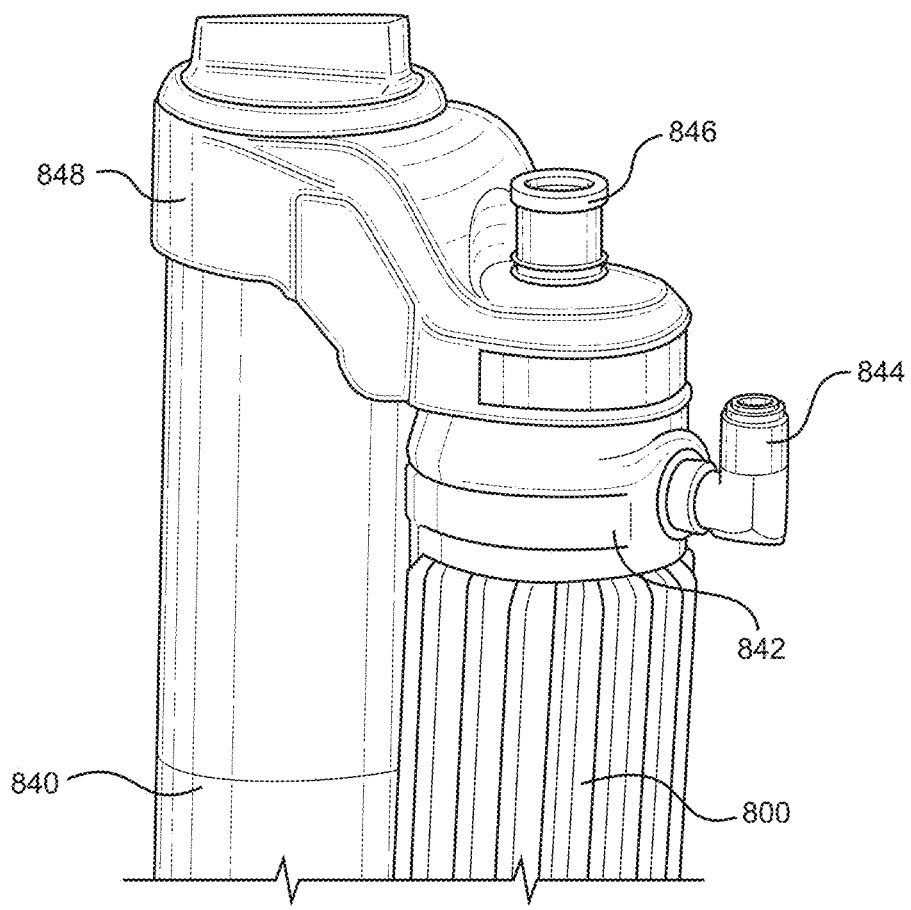
FIG. 8 shows an embodiment where the cooler is placed next to a piggyback reservoir.

FIG. 8 shows an embodiment where the cooler 800 is placed next to a piggyback reservoir 840. This figure also includes dual speed compression (DSC) adapter 842, a first hose adapter 842, a second hose adapter 844, and coupler 848.

In this embodiment, coupler 848 is used to couple the cooler 800 to the piggyback reservoir 840. Coupler 848 is placed between the piggyback reservoir 840 and the body cap that connects the piggyback reservoir 840 to the shock absorber.

Figure 9:
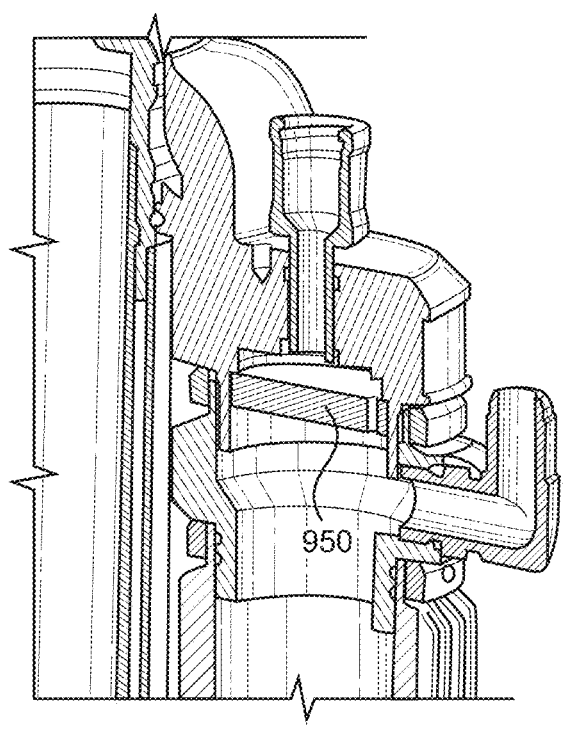
FIG. 9 shows a cross section view of an embodiment where the cooler is placed next to a piggyback reservoir.

FIG. 9 shows a cross section view of an embodiment where the cooler 800 is placed next to a piggyback reservoir 840. This figure also includes check shims 950.

Figure 10:
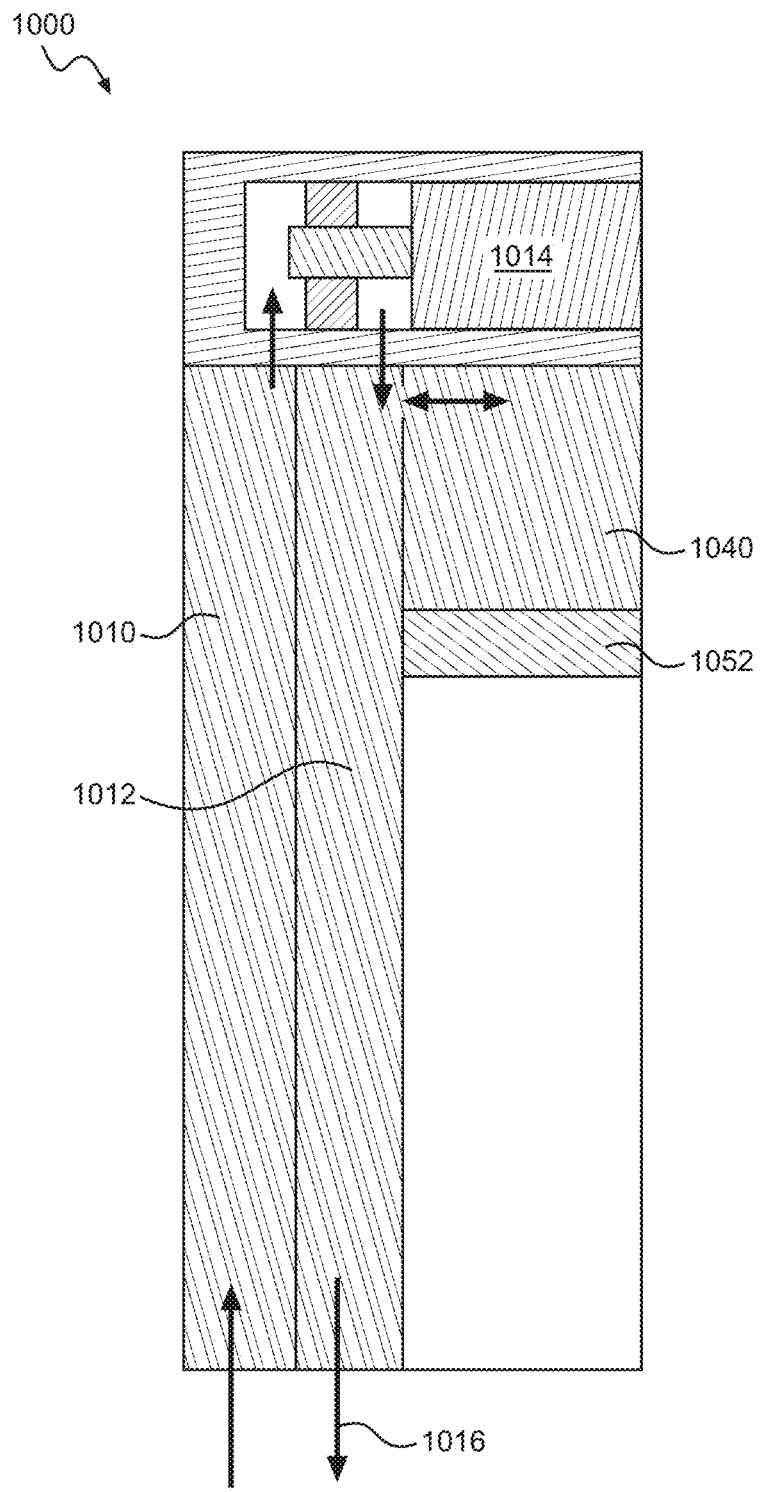
FIG. 10 shows a cross section drawing of a cooler with an integrated reservoir.

FIG. 10 shows a cross section drawing of a cooler 1000 with an integrated reservoir 1040. FIG. 10 also includes a first chamber 1010, a second chamber 1012, a base valve 1014, flow arrows 1016, and internal floating piston 1052. In this embodiment, the integrated reservoir 1040 is part of cooler 1000. Flow arrows 1016 show the fluid flow during a compression stroke.

Following flow arrows 1016, fluid would flow from a compression chamber and enter the first chamber 1010, pass through base valve 1014, and then enter the second chamber 1012 which has a connection to the integrated reservoir 1040. Integrated reservoir 1040 would then fill up such that the internal floating piston 1052 moves to accommodate for the extra fluid. The fluid may then flow out of the second chamber 1012 and the cooler 1000. In some embodiments, the fluid would flow to a rebound chamber.

Figure 11:
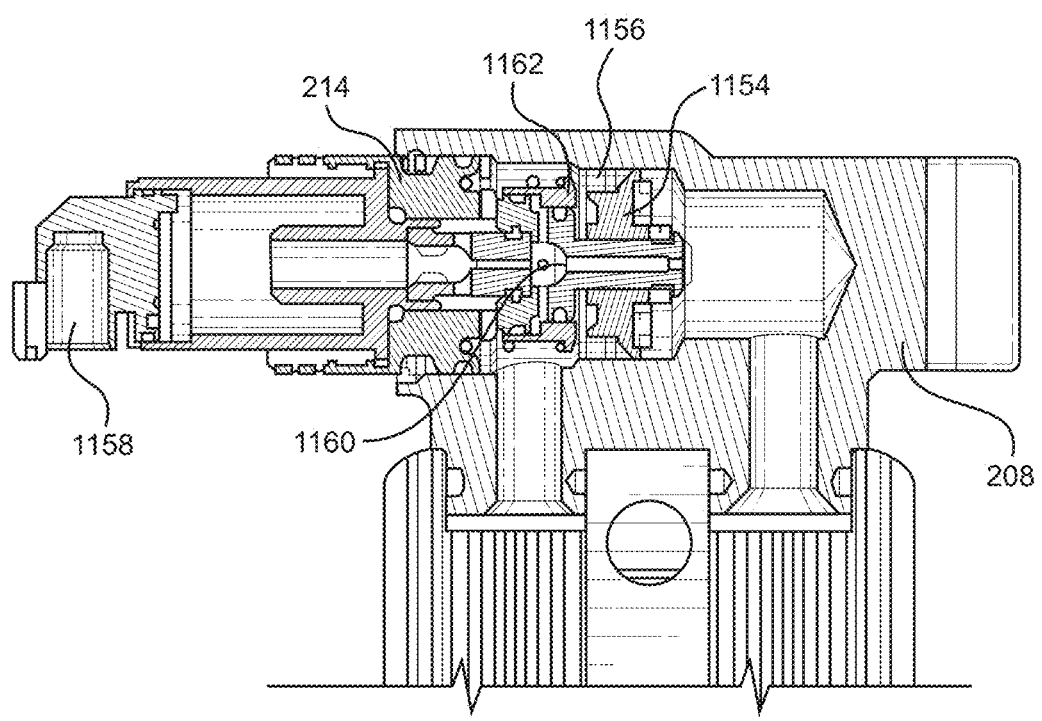
FIG. 11 shows a close up of the base valve in the cooler body cap.

FIG. 11 shows a close up of the base valve 214 in the cooler body cap 208. Also included is vented piston 1154, base valve shim stack 1156, solenoid 1158, In some embodiments, base valve 214 has a vented piston 1154. In some embodiments, there is a base valve shim stack 1156 coupled to the vented piston 1154. In some embodiments, the opening pressure of the base valve shim stack 1156 is a constant value.

In some embodiments, base valve 214 is an electronic modal base valve. In some embodiments, base valve 214 has a solenoid 1158. In some embodiments, solenoid 1158 is used to vary the preload on the base valve shims 1156.

In some embodiments, base valve chamber 1160 allows for fluid to bypass the vented piston 1154, and the vented piston 1154 is a secondary flow path. In some embodiments, base valve 214 includes boost valve 1162. Boost valve 1162 will exert pressure on base valve shims 1156 based on the fluid flow through base valve chamber 1160. In some embodiments, boost valve 1162 is used to vary the preload on base valve shims 1156.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A cooling device comprising:
   a cooler body, wherein the cooler body has a first chamber and a second chamber;
   a first hose that is fluidly coupled to the first chamber;
   a second hose that is fluidly coupled to the second chamber;
   an adapter, wherein the adapter is connected to the first hose and the second hose, wherein the adapter has channels to direct fluid flow;
   wherein the adapter fluidly couples the first hose to a compression chamber, wherein the adapter fluidly couples the second hose to a piggyback reservoir; and
   a shim stack is disposed between the compression chamber and the piggyback reservoir to prevent fluid flow from the compression chamber to the piggyback reservoir.

2. The cooling device of claim 1 wherein, the cooler body has cooling fins on an external surface.

3. The cooling device of claim 1 wherein, the recess is capable of coupling to multiple types of base valves.

4. The cooling device of claim 1 wherein, the base valve is in the fluid flow path between the first chamber and the second chamber.

5. The cooling device of claim 1 wherein, the base valve is retained in the recess by a snap fit.

6. The cooling device of claim 1 wherein, the first hose and the second hose are of different lengths.

7. A cooling device comprising:
   a cooler body with cooling fins on an external surface, wherein the cooler body has a first chamber and a second chamber;
   a cooler body cap disposed to fluidly couple the first chamber and the second chamber, wherein the cooler body cap has a recess that is suitable to receive a base valve such that the base valve is in the fluid flow path between the first chamber and the second chamber;
   a first hose that is fluidly coupled to the first chamber;
   a second hose that is fluidly coupled to the second chamber; and
   an adapter, wherein the adapter is connected to the first hose and the second hose, wherein the adapter has channels to direct fluid flow, wherein the channels fluidly couple the first hose to the compression side, wherein the channels fluidly couple the second hose to a piggyback reservoir, wherein a shim stack is disposed between the compression chamber and the piggyback reservoir to prevent fluid flow from the compression chamber to the piggyback reservoir.

8. The cooling device of claim 7 wherein, the recess can receive more than one type of base valve.

9. The cooling device of claim 7 wherein, the base valve is retained in the recess by a snap fit.

10. The cooling device of claim 7 wherein, the first hose and the second hose are of different lengths.

11. A shock absorber comprising:
    a cylinder, said cylinder comprising a cylinder inner diameter;
    a rod;
    a main damping piston, said main damping piston coupled to said rod and configured for operation within said cylinder, said main damping piston configured to divide said cylinder into a compression side and a rebound side; and
    a cooling device fluidically coupled to said compression side chamber for regulating fluid temperature in said shock absorber comprising:

a cooler body, wherein the cooler body has a first chamber and a second chamber;

a cooler body cap disposed to fluidly couple the first chamber and the second chamber, wherein the cooler body cap has a recess that is suitable to receive a base valve;

a first hose that is fluidly coupled to the first chamber;

a second hose that is fluidly coupled to the second chamber;

an adapter, wherein the adapter is connected to the first hose and the second hose, wherein the adapter has channels to direct fluid flow, wherein the adapter fluidly couples the first hose to a compression chamber, and wherein the adapter fluidly couples the second hose to a piggyback reservoir; and a shim stack is disposed between the compression chamber and the piggyback reservoir to prevent fluid flow from the compression chamber to the piggyback reservoir.

12. The cooling device of claim 11 wherein, the cooler body has cooling fins on an external surface.

13. The cooling device of claim 11 wherein, the recess can receive more than one type of base valve.

14. The cooling device of claim 11 wherein, the base valve is in the fluid flow path between the first chamber and the second chamber.

15. The cooling device of claim 11 wherein, the base valve is retained in the recess by a snap fit.

* * * * *